US009397610B2

(12) United States Patent
Han

(10) Patent No.: US 9,397,610 B2
(45) Date of Patent: Jul. 19, 2016

(54) PHOTOVOLTAIC MODULE AND CONTROL METHOD THEREOF

(75) Inventor: Dongho Han, Seoul (KR)

(73) Assignee: LG Electronics Inc., Seoul (KR)

( * ) Notice: Subject to any disclaimer, the term of this patent is extended or adjusted under 35 U.S.C. 154(b) by 1090 days.

(21) Appl. No.: 13/427,163

(22) Filed: Mar. 22, 2012

(65) Prior Publication Data

US 2012/0262949 A1 Oct. 18, 2012

(30) Foreign Application Priority Data

Apr. 12, 2011 (KR) .................. 10-2011-0033730

(51) Int. Cl.
H02S 40/34 (2014.01)
H02J 3/38 (2006.01)
H02S 50/10 (2014.01)

(52) U.S. Cl.
CPC ............. H02S 40/345 (2014.12); H02J 3/385 (2013.01); H02S 40/34 (2014.12); H02S 50/10 (2014.12); Y02E 10/58 (2013.01)

(58) Field of Classification Search
CPC .. H02M 3/33569; H02S 40/345; H02S 50/10; Y02E 10/58; H01L 22/00
USPC ................. 363/16, 95; 702/64; 323/299, 906; 320/101
See application file for complete search history.

(56) References Cited

U.S. PATENT DOCUMENTS

| | | | |
|---|---|---|---|
| 7,042,195 B2 * | 5/2006 | Tsunetsugu et al. ........... 320/101 |
| 8,963,369 B2 * | 2/2015 | Sella et al. ....................... 307/52 |
| 9,209,707 B2 * | 12/2015 | Park ........................ H02J 3/385 |
| 2006/0231132 A1 * | 10/2006 | Neussner .......... H01L 31/02021 136/244 |
| 2007/0221267 A1 | 9/2007 | Fornage |
| 2008/0238195 A1 | 10/2008 | Shaver et al. |
| 2011/0083733 A1 * | 4/2011 | Marroquin ............... H05K 7/10 136/256 |
| 2011/0264288 A1 * | 10/2011 | Khajehoddin ............ G05F 1/67 700/287 |
| 2012/0043818 A1 * | 2/2012 | Stratakos ................ H02J 3/383 307/77 |
| 2012/0318318 A1 * | 12/2012 | Metin .................. H01L 31/0504 136/244 |
| 2013/0041511 A1 * | 2/2013 | Kohno et al. .................. 700/286 |
| 2014/0077608 A1 * | 3/2014 | Nosaka ..................... G05F 1/67 307/77 |
| 2015/0144176 A1 * | 5/2015 | Chang ..................... H02J 3/383 136/244 |

* cited by examiner

Primary Examiner — Jue Zhang
Assistant Examiner — Htet Z Kyaw
(74) Attorney, Agent, or Firm — Dentons US LLP

(57) ABSTRACT

A photovoltaic module includes: a solar cell module including a plurality of solar cells; a junction box including a capacitor unit to store DC power supplied from the solar cell module, a dc/dc converter unit to level-convert the stored DC power and output the same; and a controller to control a voltage or current based on the supplied DC power from the solar cell module among a plurality of sections, calculate a local maximum power point in each of the sections using the controlled voltage or controlled current, determine a maximum power value among a plurality of calculated local maximum power points, and to control the dc/dc converter unit to output the level-converted DC power based on the determined maximum power value when a hot spot occurs in the solar cell module.

15 Claims, 15 Drawing Sheets

PHOTOVOLTAIC MODULE AND CONTROL METHOD THEREOF

CROSS-REFERENCE TO RELATED APPLICATION

This application claims the priority benefit of Korean Patent Application No. 10-2011-0033730, filed on Apr. 12, 2011, in the Korean Intellectual Property Office, the disclosure of which is incorporated herein by reference.

BACKGROUND

1. Field of the Disclosure

The present disclosure relates to a photovoltaic module (or a solar module) and a control method thereof and, more particularly, to a photovoltaic module capable of outputting maximum power when a hot spot occurs, and a control method thereof.

2. Description of the Related Art

Recently, as existing energy resources such as oil or coal are expected to be exhausted, an interest in alternative energy for replacing oil or coal is increasing. In particular, a solar cell which directly converts (or transforms) solar energy into electric energy by using a semiconductor element is getting the spotlight as a next-generation cell.

Meanwhile, a photovoltaic module refers to a device in which solar cells for photovoltaic power generation are connected in series or in parallel, and the photovoltaic module may include a junction box collecting electricity produced by the solar cells.

SUMMARY

One aspect provides a photovoltaic module capable of outputting maximum power when a hot spot occurs, and a control method thereof.

Another aspect provides a photovoltaic module which can be easily installed and is advantageous for increasing capacity in constituting a system.

According to an aspect, there is provided a photovoltaic module including: a solar cell module including a plurality of solar cells; a junction box including a capacitor unit to store DC power supplied from the solar cell module, a dc/dc converter unit to level-convert the stored DC power and output the level-converted DC power; and a controller to control a voltage or current based on the supplied DC power from the solar cell module among a plurality of sections, calculate a local maximum power point in each of the sections using the controlled voltage or controlled current, determine a maximum power value among a plurality of calculated local maximum power points, and to control the dc/dc converter unit to output the level-converted Dc power based on the determined maximum power value when a hot spot occurs in the solar cell module.

According to another aspect, there is provided a photovoltaic module including: a plurality of solar cells; a capacitor unit to store DC power supplied from the solar cell module; a dc/dc converter unit to level-convert the stored DC power and output the level-converted DC power; and a controller to determine whether a hot spot has occurred, wherein when the controller determines that the hot spot has not occurred, the controller applying a first maximum power point tracking (MPPT) algorithm to control a voltage or current based on the supplied DC power from the solar cell module in a section where the section is a voltage range or a current range, determine a maximum power value using the controlled voltage or controlled current, and to control the dc/dc converter unit to output the level-converted DC power based on the determined maximum power value, and when the controller has determined that the hot spot has occurred, the controller applying a second maximum power point tracking (MPPT) algorithm to control the voltage or current based on the supplied DC power from the solar cell module among a plurality of sections, calculate a local maximum power point in each of the sections using the controlled voltage or controlled current, determine a maximum power value among a plurality of calculated local maximum power points, and to control the dc/dc converter unit to output the level-converted DC power based on the determined maximum power value.

According to another aspect, there is provided a method for controlling a photovoltaic module, including: detecting at least one of a DC voltage and a DC current supplied from a solar cell module; determining by a controller whether or not a hot spot has occurred based on the at least one of the detected DC voltage and the detected DC current; when a hot spot has occurred, dividing by the controller at least one of the supplied DC voltage and DC current into a plurality of sections and calculating a local maximum power point in each of the sections; and determining by the controller a maximum value from among a plurality of calculated local maximum power points.

DETAILED DESCRIPTION

Exemplary embodiments of the present invention will now be described in detail with reference to the accompanying drawings.

In the following description, usage of suffixes such as 'module', 'part' or 'unit' used for referring to elements is given merely to facilitate explanation of the present disclosure, without having any significant meaning in itself. Thus, the 'module' and 'part' may be interchangeably used.

Figure 1:
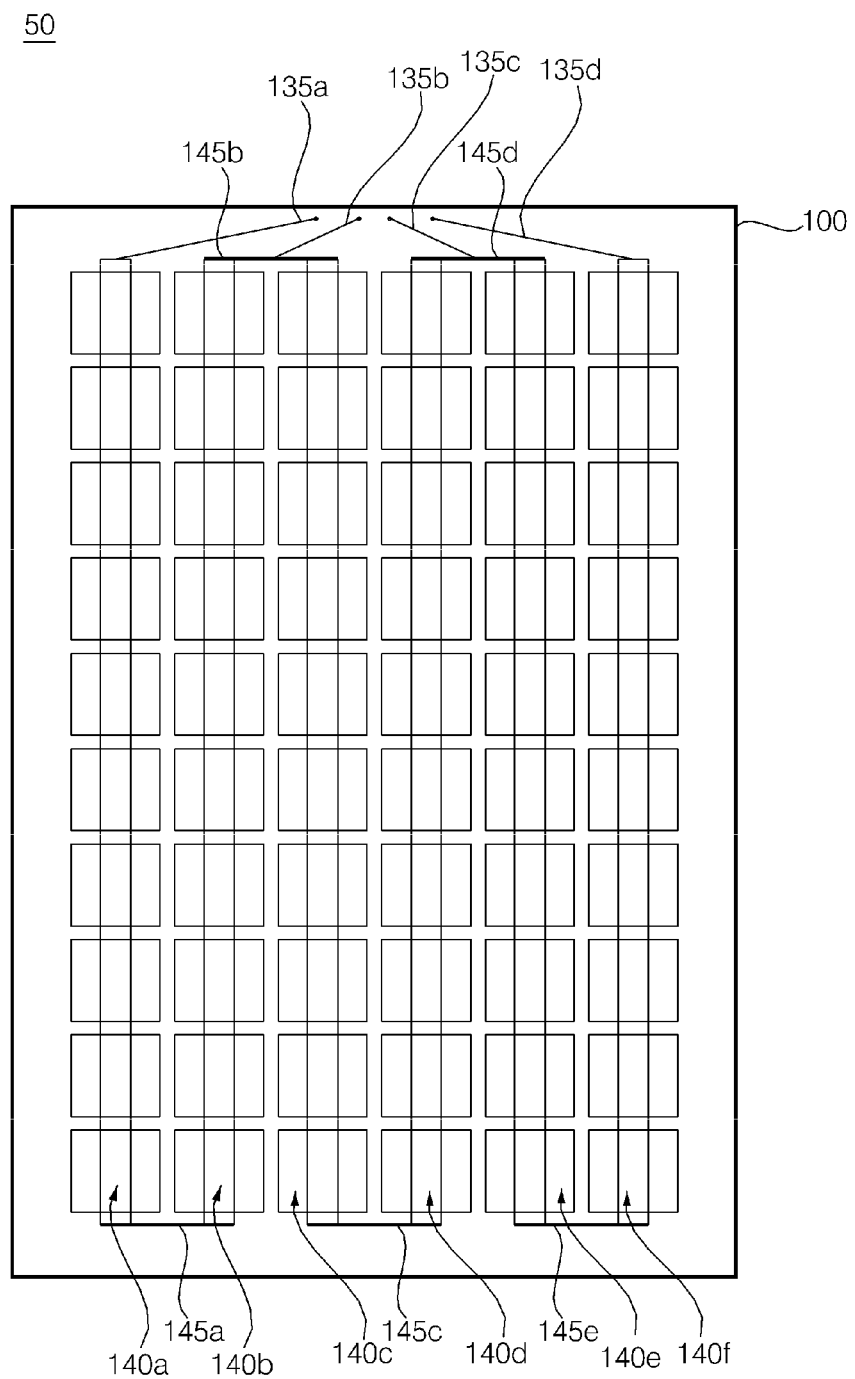
FIG. 1 is a front view of a photovoltaic module according to an embodiment of the present invention.
Figure 2:
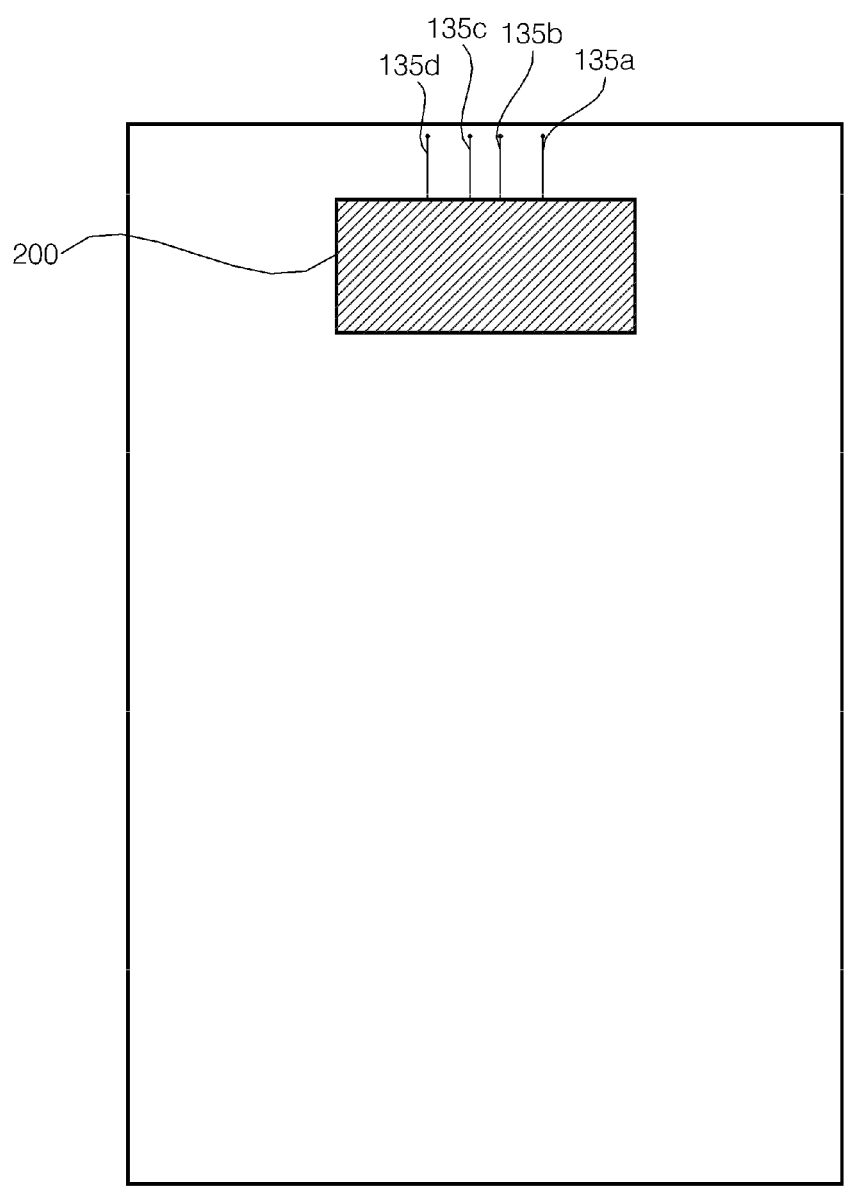
FIG. 2 is a rear view of the photovoltaic module of FIG. 1.
Figure 3:
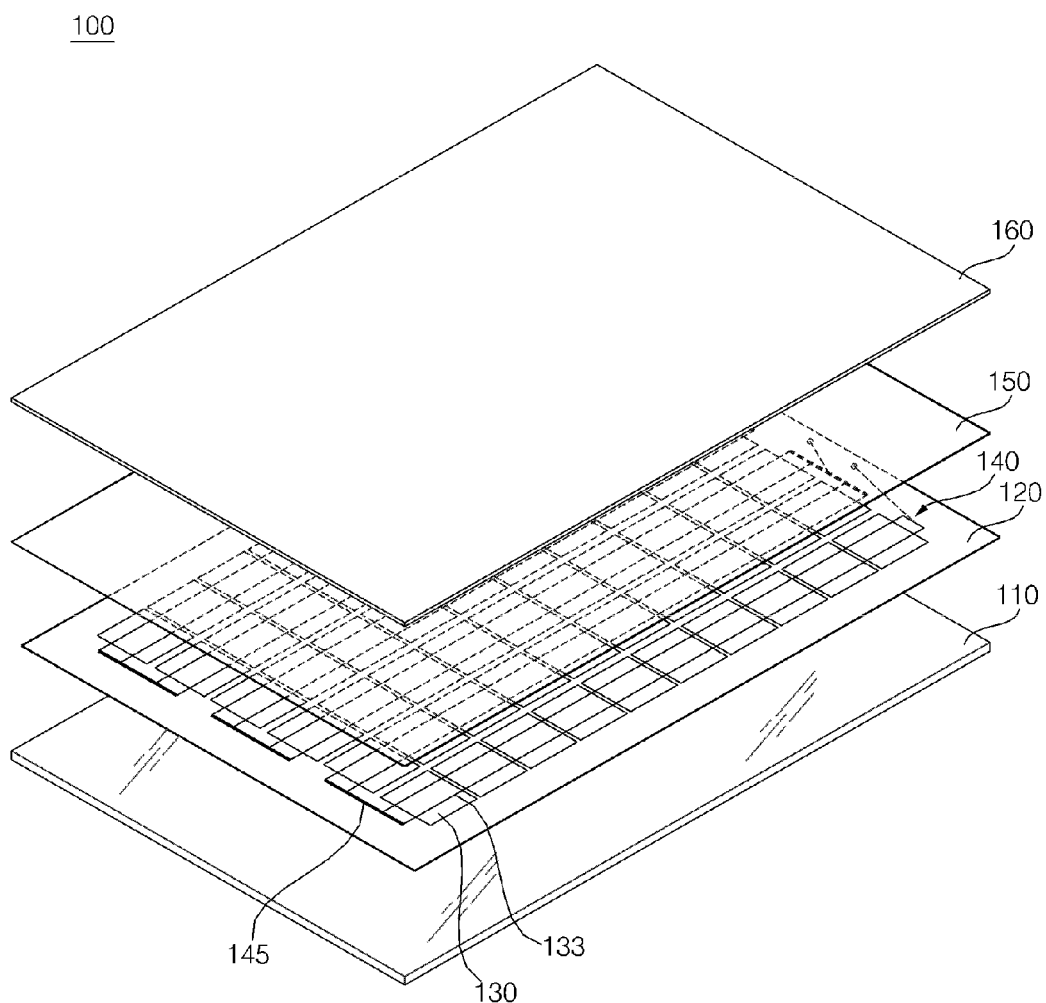
FIG. 3 is an exploded perspective view of the photovoltaic module of FIG. 1.

FIG. 1 is a front view of a photovoltaic module according to an embodiment of the present invention. FIG. 2 is a rear view of the photovoltaic module of FIG. 1. FIG. 3 is an exploded perspective view of the photovoltaic module of FIG. 1.

With reference to FIGS. 1 to 3, a photovoltaic module 50 according to an embodiment of the present invention includes a solar cell module 100 and a junction box 200 positioned on one surface of the solar cell module 100. The solar cell module 100 may further include a heat releasing member (not shown) disposed between the solar cell module 100 and the junction box 200.

The solar cell module 100 may include a plurality of solar cells 130. Also, the solar cell module 100 may further include a first sealing member 120 and a second sealing member 150 positioned on lower and upper surfaces of the plurality of solar cells 130, a rear substrate 110 positioned on a lower surface of the first sealing member 120, and a front substrate 160 positioned on an upper surface of the second sealing member 150.

Each of the solar cells 130 is a semiconductor device converting solar energy into electric energy and may be a silicon solar cell, a compound semiconductor solar cell, a tandem solar cell, a dye-sensitized solar cell, a CdTe or CIGS type solar cell, or the like.

Each of the solar cells 130 is configured to have a light receiving face to which solar light is made incident and a rear face, which is opposite to the light receiving face.

For example, each of the solar cells 130 may include a silicon substrate having a first conductivity type, a semiconductor layer formed on the silicon substrate and having a second conductivity type which is opposite to the first conductivity type, an anti-reflective film formed on the second conductivity type semiconductor layer, a front electrode in contact with a portion of the second conductivity type semiconductor layer through the anti-reflective film, and a rear electrode formed on a rear surface of the silicon substrate.

The respective solar cells 130 may be electrically connected in series, in parallel, or in series and parallel. In detail, the plurality of solar cells 130 may be electrically connected by a ribbon 133. The ribbon 133 may be bonded to the front electrode formed on a light receiving face of a solar cell and to the rear electrode formed on a rear surface of an adjacent solar cell 130.

In the drawing, it is illustrated that the ribbons 133 are formed in two rows, and the solar cells 130 are connected in a row by the ribbons 133, forming solar cell strings 140. Accordingly, six strings 140a, 140b, 140c, 140d, 140e, and 140f are formed, and each string includes ten solar cells. However, various modifications may be made, unlike that of the drawing.

Meanwhile, the respective solar cell strings may be electrically connected by bus ribbons. FIG. 1 illustrates that the first solar cell string 140a and the second solar cell string 140b, the third solar cell string 140c and the fourth solar cell string 140d, and the fifth solar string 140e and the sixth solar cell string 140f are electrically connected by bus ribbons 145a, 145c, and 145e disposed at a lower portion of the solar cell module 100, respectively. Also, FIG. 1 illustrates that the second solar cell string 140b and the third solar cell string 140c, and the fourth solar cell string 140d and the fifth solar cell string 140e are electrically connected by bus ribbons 145b and 145d disposed at an upper portion of the solar cell module 100, respectively.

Meanwhile, the ribbon connected to the first string, the bus ribbons 145b and 145d, and the ribbon connected to the sixth string are electrically connected to the first to fourth conductive lines 135a, 135b, 135c, and 135d, respectively, and the first to fourth conductive lines 135a, 135b, 135c, and 135d are connected with bypass diodes Da, Db, and Dc (see, for example, FIG. 4) within the junction box 200 disposed on the rear surface of the solar cell module 100. In the drawing, it is illustrated that the first to fourth conductive lines 135a, 135b, 135c, and 135d extend to the rear surface of the solar cell module 100 through openings formed on the solar cell module 100.

Meanwhile, preferably, the junction box 200 is disposed to be adjacent to be closer to an end portion, among both end portions of the solar cell module 100, where conductive lines extend.

In FIGS. 1 and 2, the first to fourth conductive lines 135a, 135b, 135c, and 135d extend from the upper portion of the solar cell module 100 to the rear surface of the solar cell module 100, so that the junction box 200 is illustrated to be positioned at the upper portion of the rear surface of the solar cell module 100. Accordingly, the length of the conductive lines may be reduced, and thus, a power loss may be reduced.

Unlike the configuration illustrated in FIGS. 1 and 2, if the first to fourth conductive lines 135a, 135b, 135c, and 135d extend from the lower portion of the solar cell module 100 to the rear surface of the solar cell module 100, the junction box 200 may be positioned at a lower portion of the rear surface of the solar cell module 100.

The rear substrate 110, as a back sheet, performs functions such as waterproofing, insulating, and filtering of ultraviolet rays. The rear substrate 110 may be a TPT (Tedlar/PET/Tedlar) type rear substrate, but is not meant to be limited thereto. Also, in FIG. 3, the rear substrate 110 has a rectangular shape but it may be fabricated to have various shapes such as a circular shape, a semi-circular shape, or the like, according to an environment in which the solar cell module 100 is installed.

Meanwhile, the first sealing member 120 may have the same size as that of the rear substrate 110 and attached to the rear substrate 110, and the plurality of solar cells 130 may be positioned to adjoin each other in several number of rows on the first sealing member 120.

The second sealing member 150 is positioned on the solar cells 130 and may be bonded to the first sealing member 120 through lamination.

Here, the first sealing member 120 and the second sealing member 150 may enable respective elements of the solar cells to be chemically bonded. The first sealing member 120 and the second sealing member 150 may be, for example, an ethylene vinyl acetate (EVA) film, or the like.

Meanwhile, preferably, the front substrate 160 is positioned on the second sealing member 150 to allow solar light to be transmitted therethrough, and may be tempered glass in order to protect the solar cells 130 against external impact, or the like. Also, more preferably, in order to prevent a reflection of solar light and increase transmittance of solar light, the front substrate may be a low iron tempered glass including a amount of iron.

The junction box 200 is attached on the rear surface of the solar cell module 100, and may convert power by using DC power supplied from the solar cell module 100. In detail, the junction box 200 may include a capacitor unit (520 in FIG. 9) for storing DC power. Also, the junction box 200 may further include a dc/dc converter unit (530 in FIG. 9). Also, the junction box 200 may further include bypass diodes Da, Db, and Dc (510 in FIG. 9) for preventing a back flow of current among solar cell strings. Also, the junction box 200 may further include an inverter unit (540 in FIG. 9) for converting DC power into AC power. This will be described later with reference to FIG. 9.

In this manner, the junction box 200 according to an embodiment of the present invention may include at least the bypass diodes Da, Db, and Dc, the capacitor unit for storing DC power, and the dc/dc converter unit.

Figure 14:
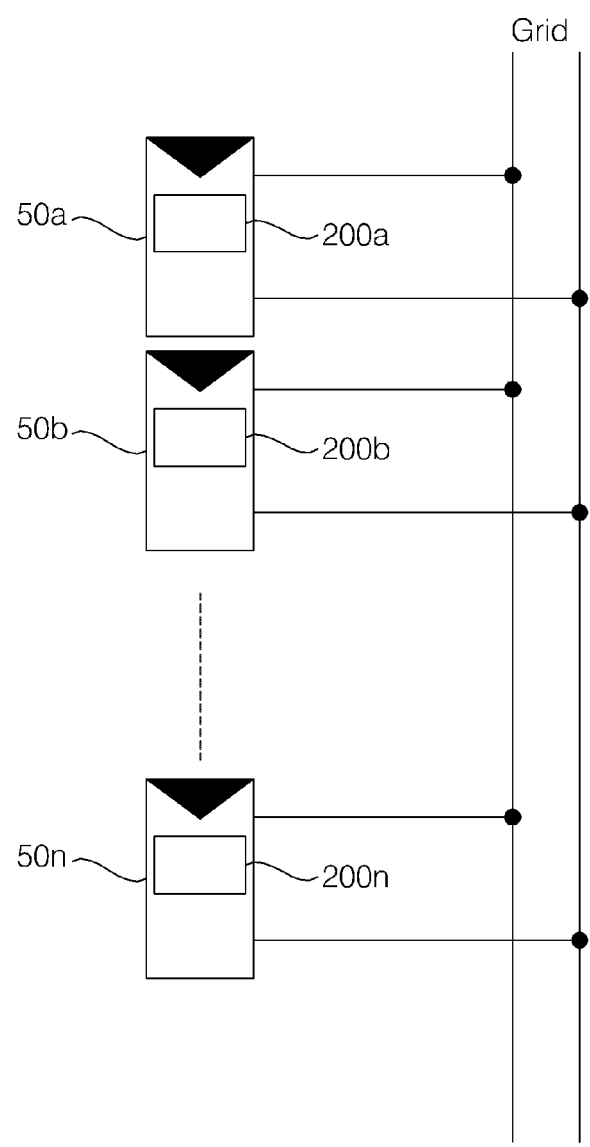
FIG. 14 is a view showing an example of the configuration of a solar photovoltaic system according to an embodiment of the present invention.
Figure 15:
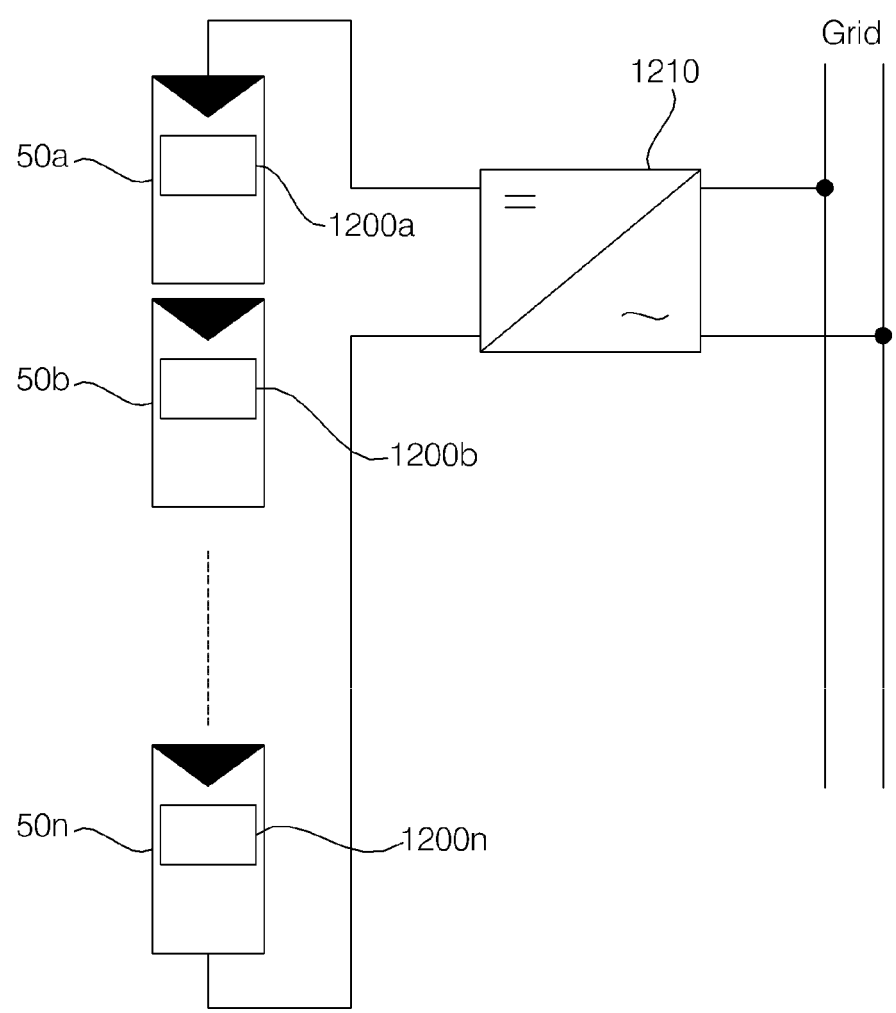
FIG. 15 is a view showing another example of the configuration of a solar photovoltaic system according to an embodiment of the present invention.

When the junction box 200 is integrally formed with the solar cell module 100, a loss of DC power generated by each solar cell module 100 may be minimized and effectively managed, like a solar photovoltaic system of FIG. 14 or 15. Meanwhile, the integrally formed junction box 200 may be called an MIC (Module Integrated Converter).

Meanwhile, in order to prevent an infiltration of moisture to circuit elements in the junction box 200, the interior of the junction box may be coated with silicon, or the like.

Meanwhile, openings (not shown) are formed on the junction box 200 in order to allow the foregoing first to fourth conductive lines 135a, 135b, 135c, and 135d to be connected with the bypass diodes Da, Db, and Dc in the junction box 200.

When the junction box 200 operates, heat having a high temperature is generated from the bypass diodes Da, Db, and Dc, or the like. The generated heat may reduce the efficiency of particular solar cells 130 arranged at the position where the junction box 200 is attached.

Thus, in order to prevent the efficiency problem, the photovoltaic module 50 according to an embodiment of the present invention may further include a heat releasing member (not shown) disposed between the solar cell module 100 and the junction box 200. In order to dissipate heat generated by the junction box 200, preferably, the heat releasing member may have a larger sectional area than that of a plate also disposed between the solar cell module and the junction box 200. In another example, the heat releasing member may be formed on the entirety of the rear surface of the solar cell module 100. Preferably, the heat releasing member is made of a metal material such as gold (Au), silver (Ag), copper (Cu), aluminum (Al), tungsten (W), or the like.

An external connection terminal (not shown) may be formed at one side of the junction box 200 in order to output power-converted DC power or AC power to the outside.

Figure 4:
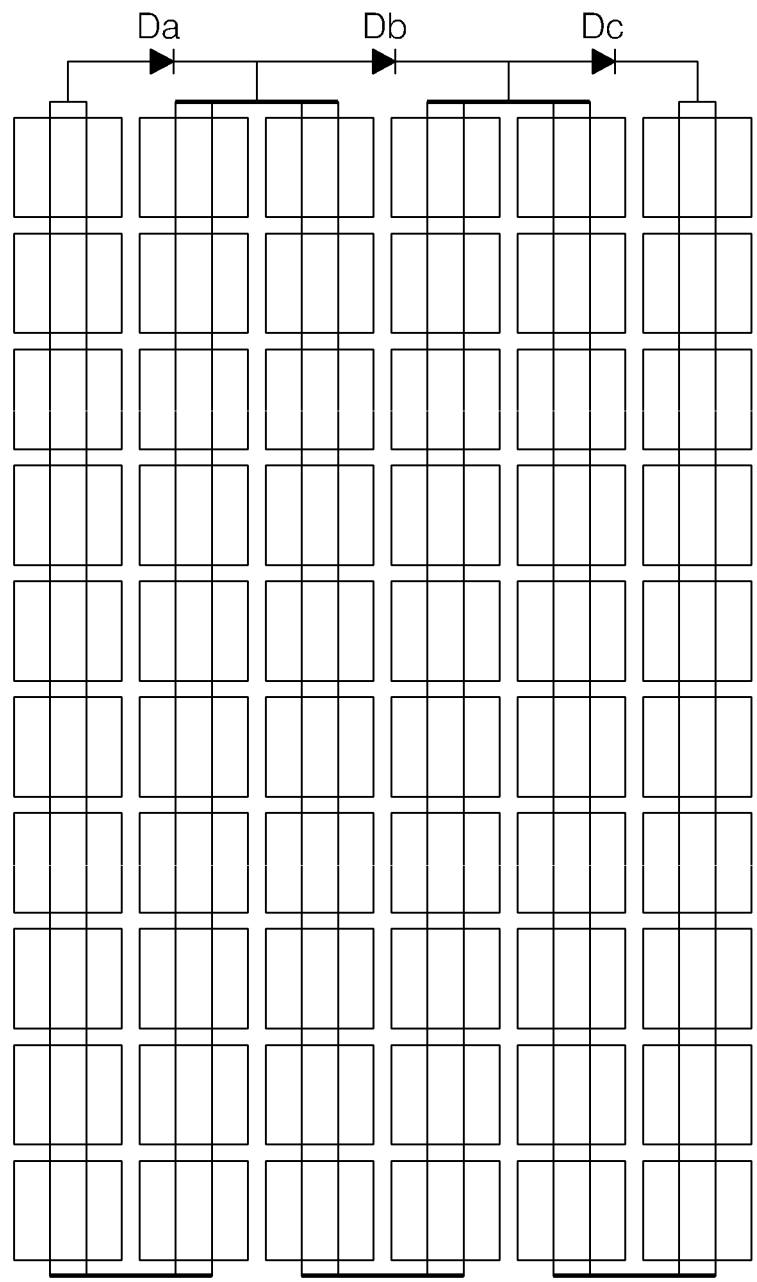
FIG. 4 is a view showing an example of bypass diodes of the photovoltaic module of FIG. 1.

FIG. 4 is a view showing an example of a bypass diode of the photovoltaic module of FIG. 1.

With reference to FIG. 4, the bypass diodes Da, Db, Dc may be connected correspondingly according to the six solar cell strings 140a, 140b, 140c, 140d, 140e, and 140f. In detail, the first bypass diode Da is connected between the first solar cell string and the first bus ribbon 145b to bypass the first solar cell string 140a and the second solar cell string 140b when a reverse voltage is generated in the first solar cell string 140a or the second solar cell string 140b.

For example, when a voltage of about 0.6V, which is generated in a normal solar cell, is generated, the potential of a cathode electrode of the first bypass diode Da is higher by about 12V (=0.6V*20) than that of an anode electrode of the first bypass diode Da. Namely, the first bypass diode Da performs a normal operation, rather than a bypassing operation.

Meanwhile, when a hot spot occurs such as when shade occurs in a solar cell of the first solar cell string 140a or when a foreign object is attached, a reverse voltage (about 15V), not the voltage of about 0.6V, is generated from a solar cell.

Accordingly, the potential of the anode electrode of the first bypass diode Da is higher by about 15V than that of the cathode electrode. Then, the first bypass diode Da performs a bypassing operation. Thus, the voltage generated in the solar cells in the first solar cell string 140a and the second solar cell string 140b is not supplied to the junction box 200. In this manner, when a reverse voltage is generated in some of the solar cells, it is bypassed, thus preventing the corresponding solar cells, or the like, from being damaged. Also, generated DC power may be supplied, except for the hot spot area.

The second bypass diode Db is connected between the first bus ribbon 145b and the second bus ribbon 145d, and when a reverse voltage is generated in the third solar cell string 140c or the fourth solar cell string 140d, the second bypass diode Db bypasses the third solar cell string 140c and the fourth solar cell string 140d.

The third bypass diode Dc is connected between the sixth solar cell string and the second bus ribbon 145d, and when a reverse voltage is generated in the fifth solar cell string 140e or the sixth solar cell string 140f, the third bypass diode Dc bypasses the fifth solar cell string and the sixth solar cell string.

Meanwhile, unlike the case of FIG. 4, six bypass diodes may be connected correspondingly according to six solar cell strings, and various other modifications may also be implemented.

Figure 5:
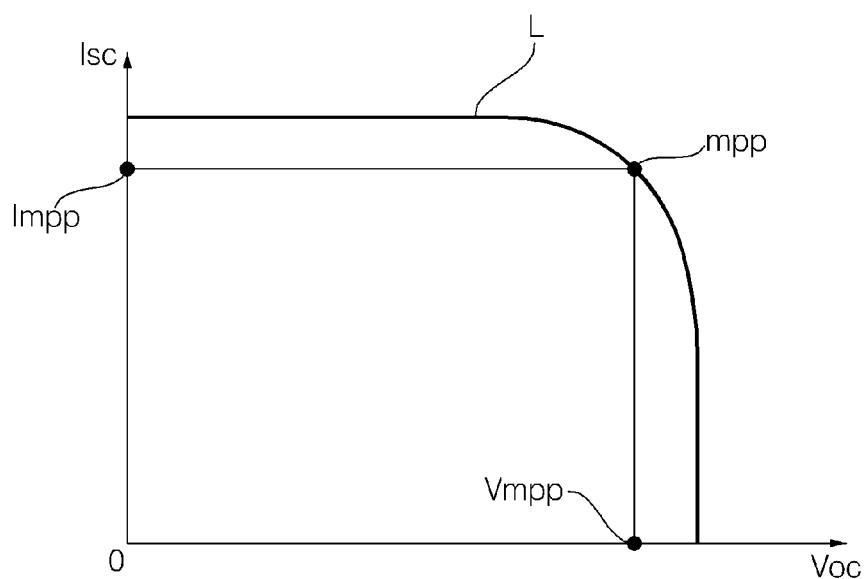
FIG. 5 is a graph showing a curved line representing current over voltage of the photovoltaic module of FIG. 1.
Figure 6:
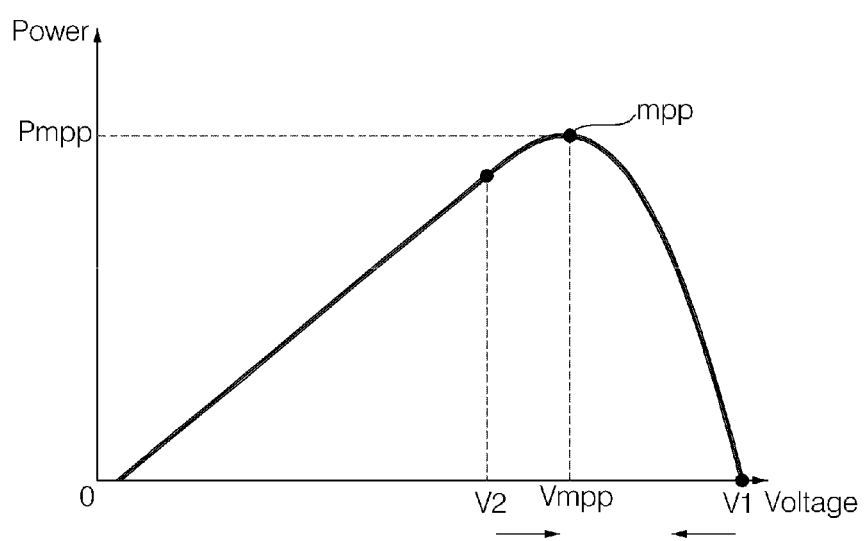
FIG. 6 is a graph showing a curved line representing power over voltage of the photovoltaic module of FIG. 1.

FIG. 5 is a graph showing a curved line representing current over voltage of the photovoltaic module of FIG. 1, and FIG. 6 is a graph showing a curved line representing power over voltage of the photovoltaic module of FIG. 1.

First, with reference to FIG. 5, as an open circuit voltage Voc supplied from the solar cell module 100 is increased, a short circuit current supplied from the solar cell module 100 is reduced. According to such a voltage-current curved line L, the corresponding voltage Voc is stored in the capacitor unit 520 provided in the junction box 200.

Meanwhile, with reference to FIG. 6, maximum power Pmpp supplied from the solar cell module 100 may be calculated by a maximum power point tracking (MPPT) algorithm.

For example, power of each voltage is calculated (or arithmetically operated) while the open circuit voltage Voc is being reduced starting from a maximum voltage V1, and whether or not the calculated power is maximum power is determined. Because power is increased from voltage V1 to voltage Vmpp, the calculated power is updated and stored. And, because power is reduced from voltage Vmpp to voltage V2, power Pmpp corresponding to the voltage Vmpp is resultantly determined as maximum power.

Thus, when a hot spot does not occur, only one point of inflection occurs in the voltage-power curved line L. Thus, the maximum power may be simply calculated by exploring the section from V1 to V2.

Figure 7:
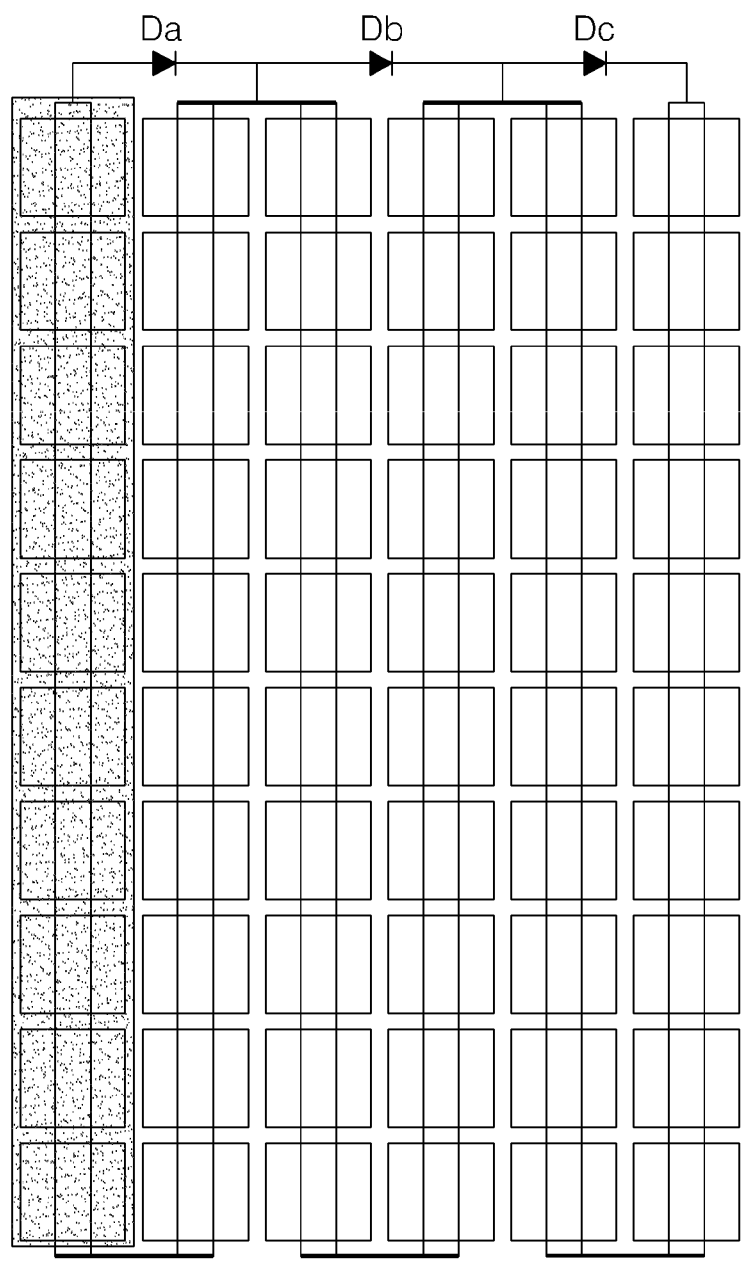
FIG. 7 shows an example of shadow occurring in the photovoltaic module of FIG. 1.

FIG. 7 shows an example of shadow occurring in the photovoltaic module of FIG. 1.

With reference to FIG. 7, it is illustrated that a hot spot occurs when shadow occurs at the first solar cell string 140a in the solar cell module 100. Thus, the first bypass diode D1 is turned on by a reverse voltage. Accordingly, DC power generated in the solar cell strings 140c, 140d, 140e, and 140f, other than the first and second solar cell strings 140a and 140b, in the solar cell module 100 is outputted. For example, when about 0.6V is generated in one solar cell, DC voltage of about 24V is outputted.

Meanwhile, when two bypass diodes are turned on, a DC voltage of about 12V is outputted.

Figure 8A:
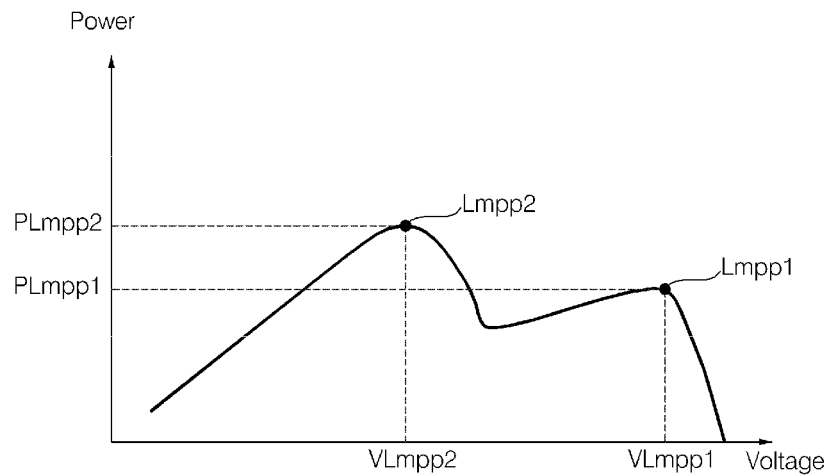
FIGS. 8A and 8B are graphs of curved lines representing various power over voltage when the shadow of FIG. 7 occurs.
Figure 8B:
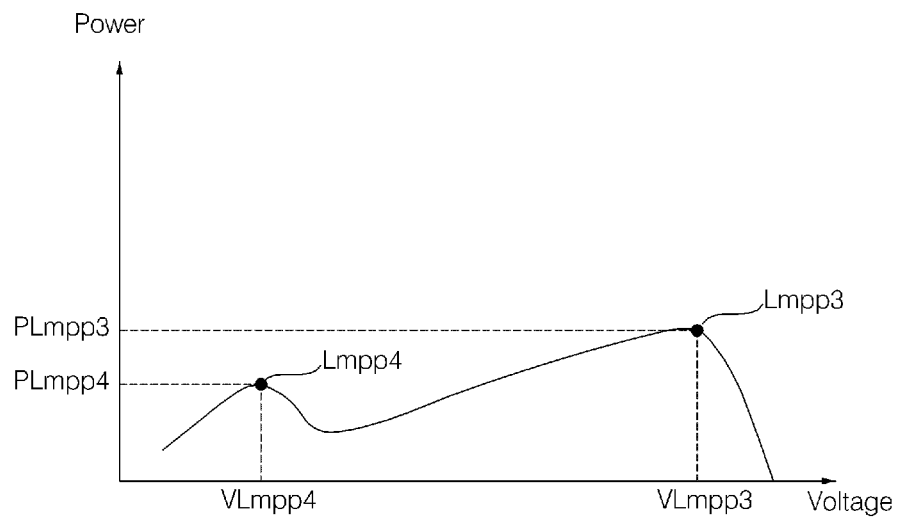

FIGS. 8A and 8B are graphs of curved lines representing various power over voltage when the shadow of FIG. 7 occurs.

First, FIG. 8A shows a case in which one of three bypass diodes Da, Db, and Dc is turned on. As shown in FIG. 8A, before a hot spot occurs, a first local maximum power point Lmpp1 corresponding to a first voltage VLmpp1 may be generated. However, when a hot spot occurs, since a DC power level supplied from the solar cell module 100 is down, a second local maximum power point Lmpp2 corresponding to a second voltage VLmpp2 may be generated.

FIG. 8B shows a case in which two of the three bypass diodes Da, Db, and Dc are turned on. As shown in FIG. 8B, before a hot spot occurs, a third local maximum power point Lmpp3 corresponding to a third voltage VLmpp3 may be generated. However, when a hot spot occurs, since a DC power level supplied from the solar cell module 100 is down, a fourth local maximum power point Lmpp4 corresponding to a fourth voltage VLmpp4 may be generated.

Figure 9:
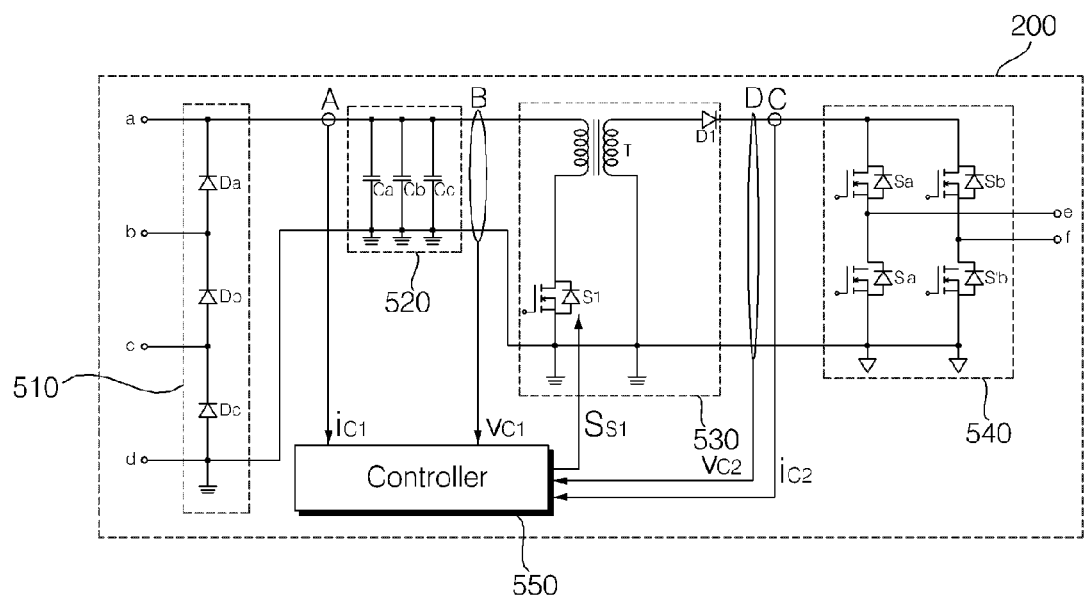
FIG. 9 shows an example of an internal circuit diagram of a junction box of the photovoltaic module according to an embodiment of the present invention.
Figure 10:
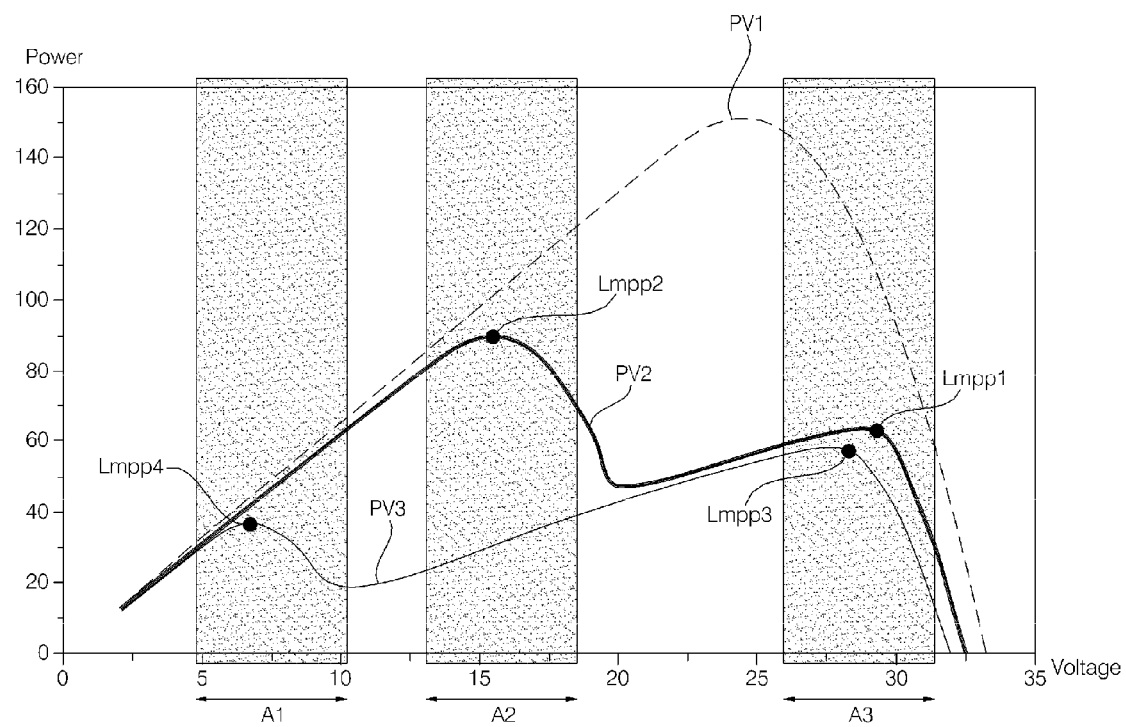
FIGS. 10 to 11B are graphs referred to in explaining the operation of the circuit diagram of FIG. 9.
Figure 11A:
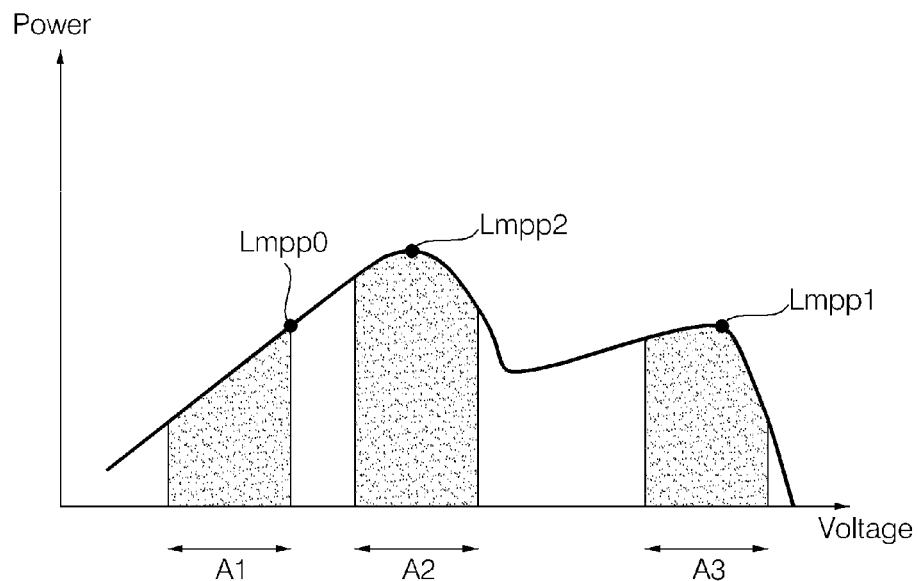
Figure 11B:
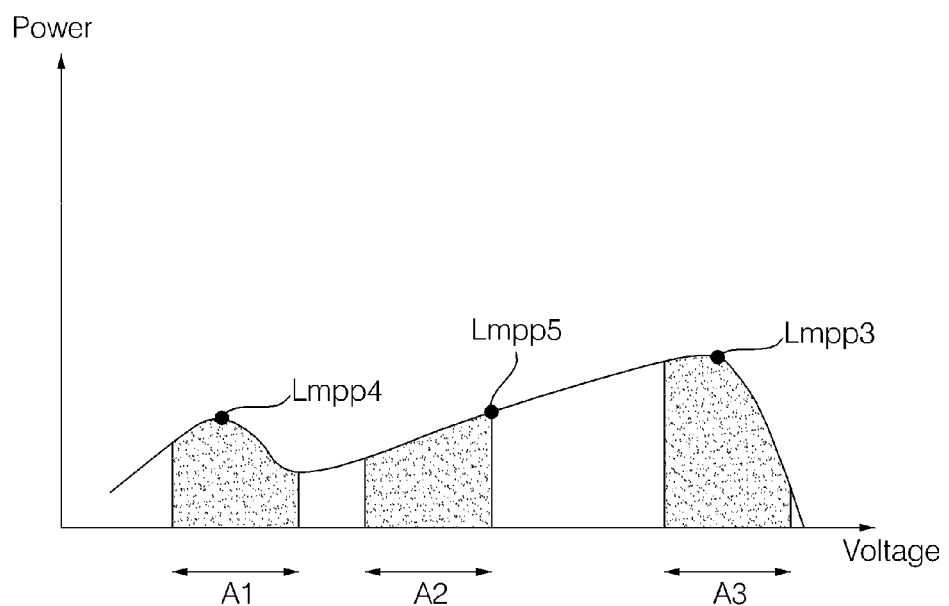

FIG. 9 shows an example of an internal circuit diagram of a junction box of the photovoltaic module according to an embodiment of the present invention, and FIGS. 10 to 11B are graphs referred to in explaining the operation of the circuit diagram of FIG. 9.

With reference to FIG. 9, the junction box 200 according to the embodiment of the present invention may include a bypass diode unit 510, the capacitor unit 520, the dc/dc converter unit 530, the inverter unit 540, and a controller 550.

The junction box 200 outputs AC power. Such a junction box 200 may be called a micro-inverter.

The bypass diode unit 510 includes first to third bypass diodes Da, Db, and Dc disposed between a, b, c, and d nodes which correspond to the first to fourth conductive lines 135a, 135b, 135c, and 135d, respectively.

The capacitor unit 520 stores DC power supplied from the solar cell module 100. In FIG. 9, it is illustrated that three capacitors Ca, Cb, and Cc are connected in parallel, but the capacitor unit is not limited thereto and the three capacitors may be connected in series or may be connected in series and parallel.

The dc/dc converter unit 530 performs conversion of DC power level by using the DC power stored in the capacitor unit 520. In FIG. 9, a flyback converter using a turn-on timing of a switching element S1 and a winding ratio of a transformer T is illustrated. Accordingly, voltage boosting of a dc level may be performed.

Besides the flyback converter illustrated in FIG. 9, a boost converter, a buck converter, a forward converter, or the like, may also be used as the dc/dc converter unit 530, or a combination thereof (e.g., a cascaded buck-boost converter, or the like) may also be used as the dc/dc converter unit 530.

The inverter unit 540 converts the level-converted DC power into AC power. In FIG. 9, a full-bridge inverter is illustrated. Namely, upper arm switching elements Sa and Sb connected in series and lower arm switching elements S'a and S'b connected in series are paired, and a total of two pairs of upper and lower arm switching elements are connected in parallel (Sa&S'a, Sb&S'b). Diodes are connected reversely parallel to the respective switching elements Sa, S'a, Sb, and S'b.

The switching elements in the inverter unit 540 are turned on or off based on an inverter switching control signal from an inverter controller (not shown). Accordingly, AC power having a certain frequency is outputted. Preferably, the AC power has the same frequency (about 60 Hz) as an AC frequency of grid.

Meanwhile, a capacitor unit (not shown) for storing the level-converted dc power may be further provided between the dc/dc converter unit 530 and the inverter unit 540. The capacitor unit (not shown) may include a plurality of capacitors, like the foregoing capacitor unit 520.

Because the junction box 200 includes the capacitor unit storing DC power, the dc/dc converter unit for converting the level of the stored DC power and outputting the same, and the inverter unit for converting the level-converted DC power into AC power and outputting the same, AC power may be simply supplied through the junction box 200. Also, the installation of the photovoltaic module 50 may be facilitated, and the capacitor may be easily increased in configuring a solar photovoltaic system including a plurality of photovoltaic modules.

An input current detection unit (A) detects current ic1 supplied to the capacitor unit 520, and an input voltage detection unit (B) detects voltage vc1 input to the dc/dc converter 530, namely, stored in the capacitor unit 520. The detected current ic1 and the voltage vc1 are inputted to the controller 550.

An output current detection unit (C) detects a current ic2 outputted from the dc/dc converter 530, and an output voltage detection unit (D) detects voltage vc2 outputted from the dc/dc converter 530. The detected current ic2 and voltage vc2 are inputted to the controller 550.

The controller 550 may calculate input power by using the detected input power ic1 or vc1. Since the input power ic1 or vc1 is DC, the controller 550 may calculate input power by multiplying the input current and the input voltage.

Also, the controller 550 may calculate output power by using the detected output power ic2 or vc2. Since the output power ic2 or vc2 is DC, the controller 550 may calculate the output power of the dc/dc converter 530 by multiplying the output current and the output voltage.

When the detected input current ic1 or input voltage vc1 is an allowable value or greater, the switching element S1 may be turned off so as to prevent DC power from being supplied from the solar cell module 100.

Meanwhile, the controller 550 may output a converter control signal $S_{S1}$ for controlling the switching element S1 of the dc/dc converter unit 530 in FIG. 9.

The controller 550 may output an inverter control signal (not shown) for controlling the switching elements of the inverter unit 540.

The controller 550 may output the turn-on timing signal $S_{S1}$ of the switching element S1 in the dc/dc converter 530 based on the detected input current ic1, input voltage vc1, output current ic2, and output voltage vc2.

For example, when the detected input current ic1 or input voltage vc1 is smaller than a pre-set value, the controller 550 may turn off the switching element S1 so that a dc/dc conversion may not be performed.

Meanwhile, the controller 550 may turn on the switching element S1 so that the detected input voltage vc1 may correspond to the voltage section (i.e., the section of V1 to V2) in FIG. 6 or may correspond to a plurality of voltage sections A1, A2, and A3 illustrated in FIGS. 10 to 11B.

For example, when the detected input voltage vc1 is the maximum value V1 as shown in FIG. 6, the controller 550 may turn on the switching element S1 such that the voltage vc1 may be reduced. Meanwhile, when the detected input voltage vc1 continues to be reduced, passing through the voltage Vmpp which corresponds to the maximum power point mpp, the controller 550 may turn off the switching element S1 such that the voltage vc1 may be increased again. Since the switching element S1 is turned off, a dc/dc level is not changed, and because the DC power is continuously supplied to the solar cell module 100, the detected voltage vc1 may be increased.

In this manner, while the detected input voltage vc1 is being explored at the voltage section (the section of V1 to V2), the controller 550 may apply a first maximum power point tracking (MPPT) algorithm.

Namely, while the input voltage vc1 detected from the first voltage V1 to the second voltage V2 is being lowered, the controller 550 may perform power calculation by using the detected input voltage vc1 and the detected input current ic1.

And, the controller 550 continuously compares the calculated power value with a previously stored power value, stores the greater of the power values, calculates power based on a next detected voltage, and then compares the calculated power value with the stored power value. Because the controller 550 stores a greater of the power values according to the comparison, it calculates a finally stored power value as a maximum power value Pmpp and calculates a point corresponding to the maximum power value, as a maximum power point mpp. Namely, the controller 550 may calculate a point of inflection at the power versus voltage curved line in FIG. 6, as a maximum power point.

In another example, with reference to FIG. 10, as for a second voltage power curved line PV2 and a third voltage power curved line PV3, it can be noted that the power versus voltage curved lines PV2 or PV3 may be divided into a voltage section A3 in which a hot spot does not occur and sections A1 and A2 in which a hot spot occurs.

In the voltage section A3 in which a hot spot does not occur, as described above, the controller 550 performs power calculation while varying the detected input voltage vc1.

And, the controller 550 continuously compares the calculated power value with the existing stored power value, stores a greater of the power values, calculates power based on a next detected voltage, and continues to compare the calculated power value with the stored power value. Since the controller 550 stores a greater of the power values according to the comparison, it may calculate a finally stored power value as a local maximum power value (Lmpp1 of PV2 or Lmpp3 of PV3) in the corresponding section A3.

In the sections A1 and A2 in which a hot spot occurs, since the bypass diode is turned on, a DC power level stored in the capacitor unit c1 is lowered. A maximum input voltage vc1 when one bypass diode is turned on may be about 24V, and a maximum input voltage vc1 when two bypass diodes are turned on may be about 12V.

The controller 550 may perform power calculation while varying the detected input voltage vc1 in the pre-set sections A1 and A2. And, the controller 550 may calculate a local maximum power value (Lmpp2 of PV2) in section A2 and a local maximum power value (Lmpp4 of PV3) in section A1, respectively.

The controller 550 determines a maximum value, among the calculated local maximum values, as a maximum power value. Namely, the controller 550 determines a maximum power point at the corresponding voltage-power curved line. By doing that, maximum power may be outputted even when a hot spot occurs.

This method may be called a second MPPT, which is different from the first MPPT.

Meanwhile, FIG. 11A, which corresponds to FIG. 8A, illustrates that when one bypass diode is turned on, local maximum power values Lmpp0, Lmpp2, and Lmpp1 are calculated in the plurality of sections A1, A2, and A3, respectively, and the second local maximum power value Lmpp2, a maximum value among them, is calculated as a maximum power value.

FIG. 11B, which corresponds to FIG. 8B, illustrates that when two bypass diodes are turned on, local maximum power values Lmpp4, Lmpp5, and Lmpp3 are calculated in the plurality of sections A1, A2, and A3, respectively, and the third local maximum power value Lmpp3, a maximum value among them, is calculated as a maximum power value.

Figure 12:
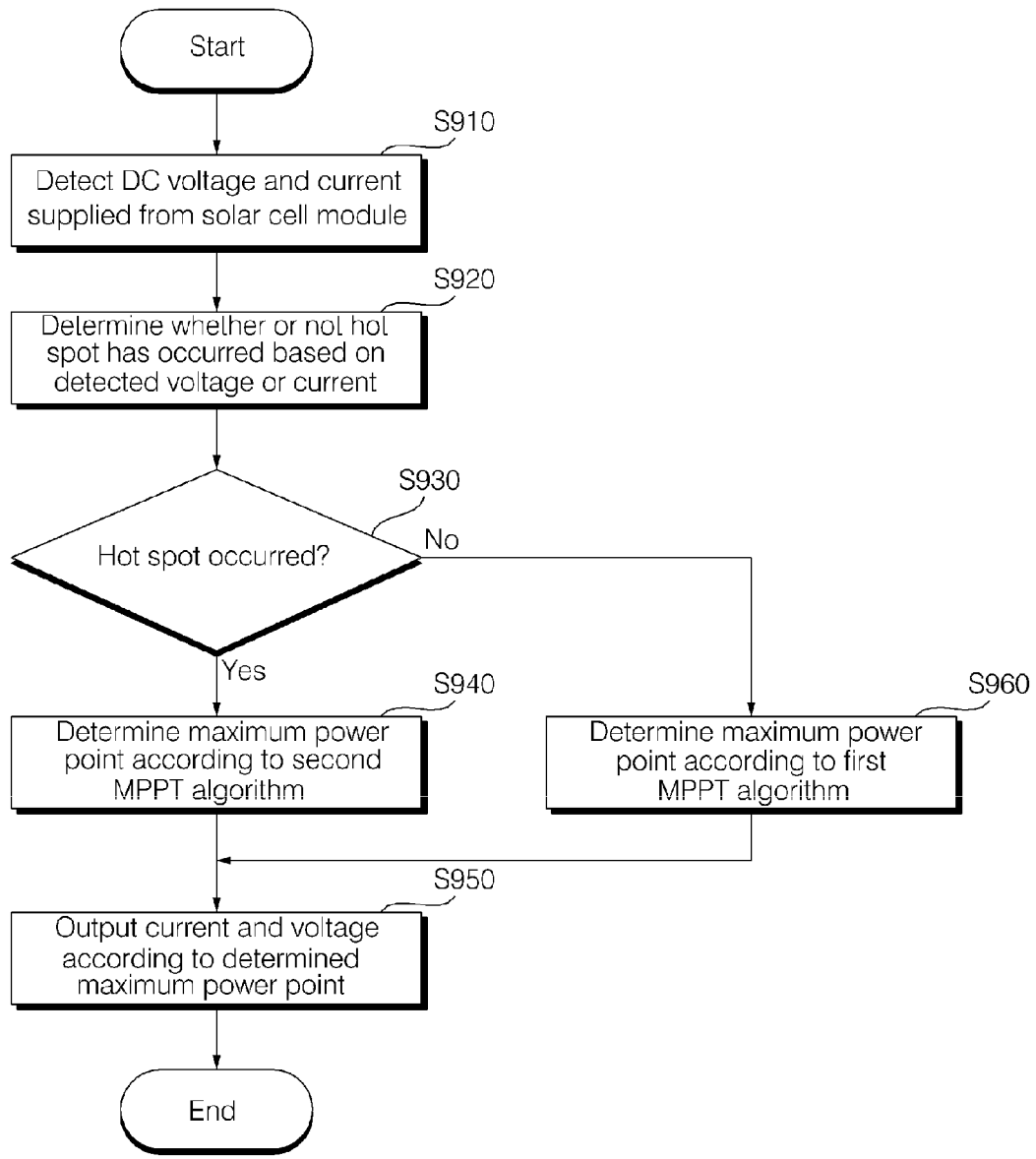
FIG. 12 is a flow chart illustrating a process of a control method of a photovoltaic module according to an embodiment of the present invention.

FIG. 12 is a flow chart illustrating a process of a control method of a photovoltaic module according to an embodiment of the present invention.

With reference to FIG. 12, a DC voltage and current supplied from the solar cell module is detected (S910). As described above, the input current detection unit (A) in FIG. 9 detects the input current ic1 supplied to the capacitor unit 520, and the input voltage detection unit (B) detects the input voltage vc1 stored in the capacitor unit 520. The detected input current ic1 and the input voltage vc1 are inputted to the controller 550.

Next, whether or not a hot spot has occurred is determined based on the detected voltage or current (S920). When the level of the detected voltage vc1 is about 36V, the controller 550 determines that a hot spot has not occurred.

When the controller 550 determines that a hot spot has not occurred in step S930, the controller 550 determines a maximum power point according to the first MPPT algorithm (S960).

Namely, as shown in FIG. 6, the controller 550 detects the maximum power point mpp while changing the detected input voltage vc1 between the first voltage V1 and the second voltage V2.

And, the controller provides control to output the maximum power Pmpp from the solar cell module 100 according to the maximum power point mpp.

Meanwhile, when the controller 550 determines that a hot spot has occurred in step S930, the controller 550 determines a maximum power point according to the second MPPT algorithm (S940).

In this case, the controller 550 determines that a hot spot has occurred when the level of the detected input voltage vc1 is about 24V (in FIG. 8A or FIG. 11A) or about 12 V (in FIG. 8B or FIG. 11B).

When the controller 550 determines that a hot spot has occurred, the controller 550 may provide control to detect local maximum power by limiting the exploring range to the plurality of sections A1, A2, and A3 for maximum power detection.

The sections A1, A2, and A3 may be those that were previously calculated with respect to the solar cell module 100, and previously stored by the controller 550.

After the local maximum power is detected in each of the sections according to the second MPPT algorithm, the controller 550 compares the respective local maximum power values to finally determine the maximum power.

After step S940 or step S960 is performed, current and voltage according to the determined maximum power point are outputted (S950).

The controller 550 controls the switch S1 of the dc/dc converter unit 550 so that the calculated maximum power (Lmpp2 in FIG. 11A and Lmpp3 in FIG. 11B) may be outputted from the solar cell module. And, the dc/dc converter unit 550 may level-convert the maximum power and output the same. And, the inverter unit 540 may output AC power.

Figure 13:
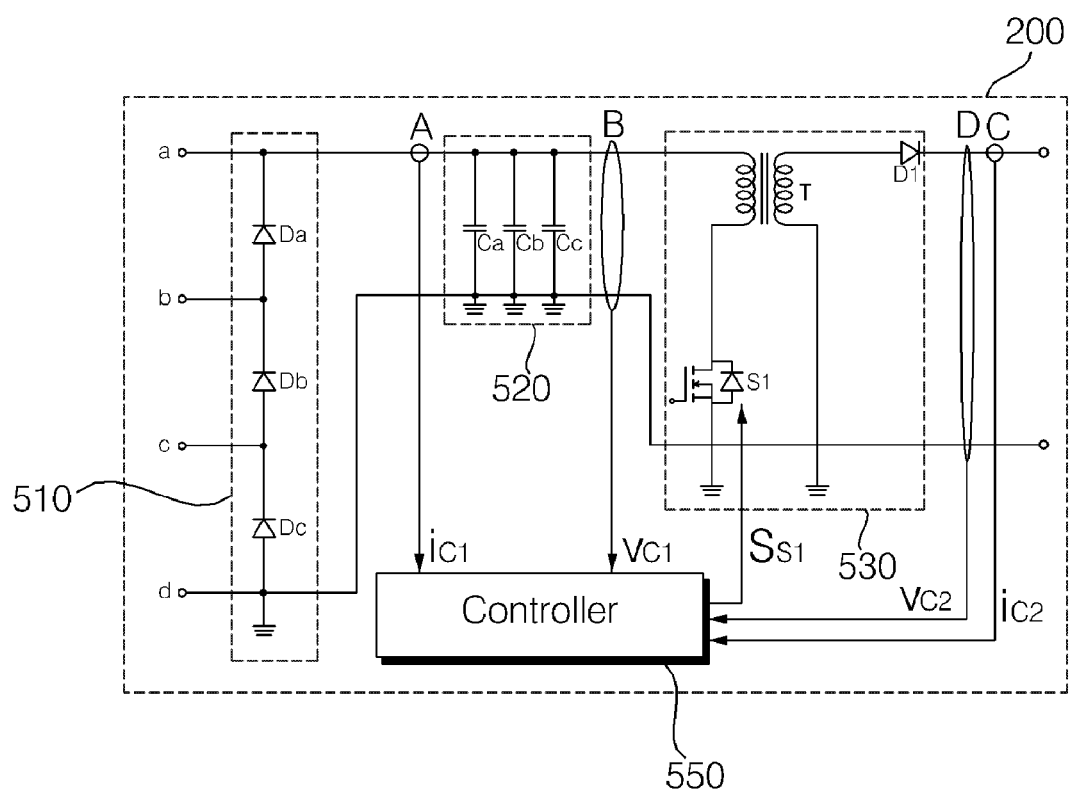
FIG. 13 shows another example of an internal circuit diagram of a junction box of the photovoltaic module according to an embodiment of the present invention.

FIG. 13 shows another example of an internal circuit diagram of the junction box of the photovoltaic module according to another embodiment of the invention.

With reference to FIG. 13, the junction box 200 according to the embodiment of the present invention may include the bypass diode unit 510, the capacitor unit 520, the dc/dc converter unit 530, and the controller 550. Unlike the internal circuit diagram of FIG. 9, the internal circuit diagram of FIG. 13 does not include the inverter unit 540.

Thus, the junction box 200 may be able to output DC power. In this case, when the junction box 200 executes a power optimizing function, and such a junction box 200 may be called a power optimizer.

As shown in FIG. 13, since the junction box 200 includes the capacitor unit storing DC power and the dc/dc converter unit converting the level of the stored DC power and outputting the same, the DC power may be simply supplied through the junction box 200. Also, the installation of the photovoltaic module 50 may be facilitated, and the capacitor may be easily increased in configuring a solar photovoltaic system including a plurality of photovoltaic modules.

Meanwhile, unlike the configurations of FIGS. 9 and 13, the junction box 200 may include only the bypass diode unit 510 and the capacitor unit 520. In this case, the dc/dc converter unit 530 and the inverter unit 540 may be disposed at an outer side of the junction box 200.

In such a case, unlike the configurations illustrated in FIGS. 9 and 13, the input current detection unit (A) may detect current input to the dc/dc converter unit 530. Namely, the input current detection unit (A) may be disposed between the junction box 200 and the dc/dc converter unit 530. Also, unlike the configurations illustrated in FIGS. 9 and 13, the input voltage detection unit (B) may detect voltage of both ends of an input terminal of the dc/dc converter unit 530. The detected input current ic1 and the input voltage vc1 may be inputted to the controller 550 and processed in such a manner as described above. Namely, the MPPT algorithm may be changed according to whether or not a hot spot occurs.

Meanwhile, the input current detection unit (A) and the input voltage detection unit (B) may be disposed at the corresponding positions as shown in FIGS. 9 and 13 to detect the current ic1 and the voltage vc1, respectively, and the detected input current ic1 and the input voltage vc1 may be inputted to the controller 550 at the outside of the junction box 200.

FIG. 14 is a view showing an example of the configuration of a solar photovoltaic system according to an embodiment of the present invention.

With reference to FIG. 14, the solar photovoltaic system according to an embodiment of the present invention may include a plurality of photovoltaic modules 50a, 50b, . . . , 50n. The photovoltaic modules 50a, 50b, . . . , 50n may include junction boxes 200a, 200b, . . . , 200n outputting AC power, respectively. In this case, the junction boxes 200a, 200b, . . . , 200n may be micro-inverters, and AC power output from the respective junction boxes 200a, 200b, . . . , 200n is supplied to a grid.

Meanwhile, the internal circuit of the junction box 200 illustrated in FIG. 9 according to an embodiment of the present invention may be applied to the micro-inverter of FIG. 14.

FIG. 15 is a view showing another example of the configuration of a solar photovoltaic system according to an embodiment of the present invention.

With reference to FIG. 15, the solar photovoltaic system according to an embodiment of the present invention may include a plurality of photovoltaic modules 50a, 50b, . . . , 50n. The photovoltaic modules 50a, 50b, . . . , 50n may include junction boxes 1200a, 1200b, . . . , 1200n outputting DC power, respectively. Also, an inverter unit 1210 for converting DC power output from the respective photovoltaic modules 50a, 50b, . . . , 50n into AC power may be further provided. In this case, the junction boxes 1200a, 1200b, . . . , 1200n may perform power optimizing in order to effectively output DC power.

Meanwhile, the internal circuit of the junction box 200 of FIG. 13 according to an embodiment of the present invention may be applied to the power optimizer of FIG. 15.

Figure 16A:
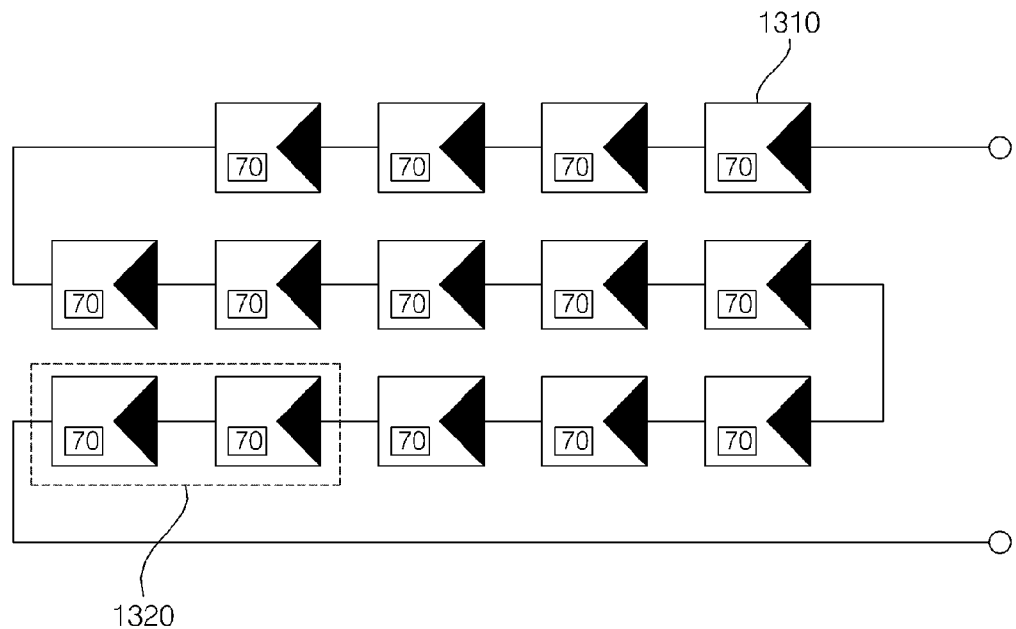
FIGS. 16A and 16B are schematic diagrams referred to in explaining power optimizing of the solar photovoltaic system according to an embodiment of the present invention.
Figure 16B:
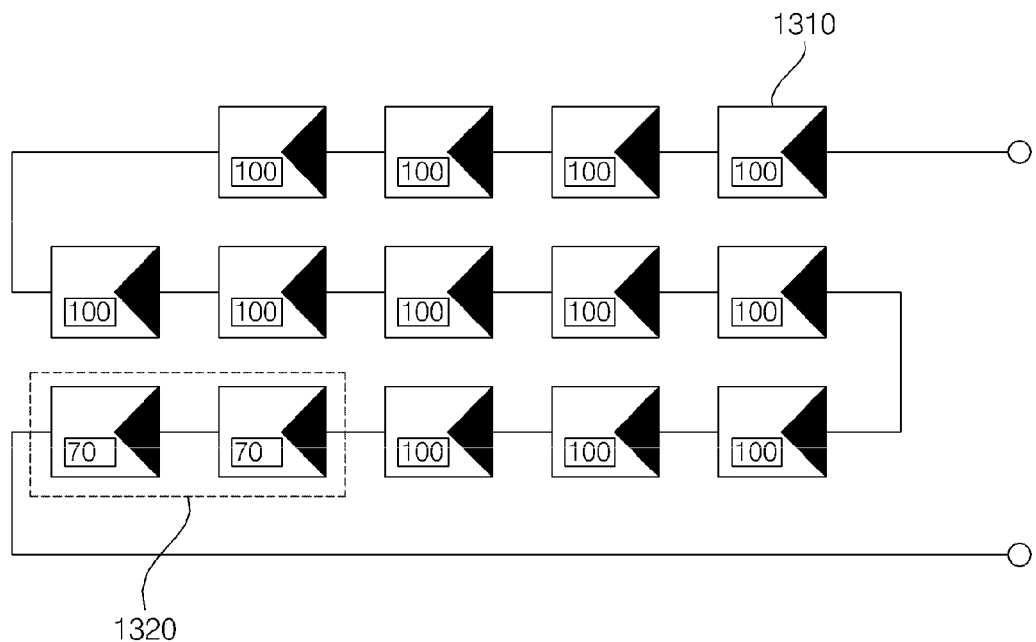

FIGS. 16A and 16B are schematic diagrams referred to in explaining power optimizing of the solar photovoltaic system according to an embodiment of the present invention.

First, a case in which power optimizing is not employed will now be described with reference to FIG. 16A. As illustrated, in a state in which a plurality of solar cell modules are connected in series, when a hot spot occurs in solar cell modules 1320 so that a power loss is made (e.g., 70 W power supply), a power loss is also made even in a normal solar cell module 1310 (e.g., 70 W power supply). Thus, only power totaling 980 W is supplied.

Next, a case in which power optimizing is employed will now be described with reference to FIG. 16B. When a hot spot occurs in solar cell modules 1320 so that a power loss is made (e.g., 70 W power supply), voltage output from the corresponding solar cell modules 1320 is lowered so that current supplied from the corresponding solar cell modules 1320 may be equal to the current supplied from a different solar cell module 1310.

For example, the controller 550 of the solar cell module 1320 in which a power loss is made may provide control such that a turn-on timing of the switching element S1 of the dc/dc converter 530 is shorter than a turn-on timing of the switching element S1 of the dc/dc converter 530 connected to the different normal solar cell module 1310. Accordingly, the dc/dc converter 530 connected to the solar cell module 1320 50 may supply smaller output power.

Thus, although a power loss (e.g., 70 W power supply) is made in the solar cell modules 1320 in which a hot spot occurs, there is no power loss in the normal solar cell module 1310 (e.g., 100 W power supply). Thus, power totaling 1340 W may be supplied.

Through power optimizing, the voltage supplied from a solar cell module in which a hot spot occurs may be adjusted according to the current supplied from a different solar cell module. To this end, each of the solar cell modules may control a voltage output, or the like, of its own upon receiving a current value or a voltage value supplied from a different solar cell module.

Meanwhile, the junction box 200 illustrated in FIG. 13 according to an embodiment of the present invention can be applicable to the power optimizing of FIG. 16B.

According to embodiments of the present invention, when a hot spot occurs, a supplied DC voltage is divided into a plurality of sections, a local maximum power point in each of the sections is calculated, and a maximum value, among a plurality of calculated local maximum power points, is determined as a maximum power point. Thus, maximum power may be outputted when a hot spot occurs.

Meanwhile, since the junction box includes the capacitor unit storing DC power and the dc/dc converter unit level-converting the stored DC power and outputting the same, power may be easily supplied through the junction box.

Also, the photovoltaic module having such a junction box may be easily installed, and when a solar photovoltaic system including a plurality of photovoltaic modules is configured, the capacity may be easily increased.

Meanwhile, since the junction box includes the capacitor unit storing DC power, the dc/dc converter unit level-converting the stored DC power and outputting the same, and the inverter unit converting the level-converted DC power into AC power and outputting the same, AC power may be simply supplied through the junction box.

The photovoltaic module according to the embodiments of the present disclosure is not limited in its application of the configurations and methods, but the entirety or a portion of the embodiments may be selectively combined to be configured into various modifications.

The control method of the photovoltaic module according to embodiments of the present invention may be implemented as codes that may be read by a processor in a processor-readable recording medium. The processor-readable recording medium includes various types of recording devices in which data read by a process is stored. The processor-readable recording medium may include a ROM, a RAM, a CD-ROM, a magnetic tape, a floppy disk, an optical data storage device, and the like. The processor-readable recording medium also includes implementations in the form of carrier waves or signals (e.g., transmission via the Internet). Also, codes which are distributed in computer system connected to a network and may be read by a processor in a distributed manner are stored and executed in the processor-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A photovoltaic module comprising:
   a solar cell module including a plurality of solar cells;
   a junction box including a plurality of bypass diodes, a capacitor unit to store DC power supplied from the solar cell module, and a dc/dc converter unit to level-convert the stored DC power and output the level-converted DC power; and
   a controller to control a voltage or current based on the supplied DC power from the solar cell module among a plurality of sections where each section is a voltage range or a current range, calculate a local maximum power point in each of the sections using the controlled voltage or controlled current, determine a maximum power value among a plurality of calculated local maximum power points, and to control the dc/dc converter unit to output the level-converted DC power based on the determined maximum power value when a hot spot occurs in the solar cell module,
   wherein the junction box further includes:
      a current detection unit to detect current supplied to the capacitor unit; and
      a voltage detection unit to detect the voltage at both ends of the capacitor unit,
   wherein when the hot spot occurs in the solar cell module, during a first section among the plurality of sections, the controller controls to vary the voltage at both ends of the capacitor unit based on the detected voltage from the voltage detection unit, performs power calculation based on the detected current and the detected voltage while varying the voltage at both ends of the capacitor unit, continuously compares calculated power value with the existing stored power value, stores a greater of the power values, and calculate a finally stored power value as a first local maximum power value after termination of exploring the first section, and wherein the first section corresponds to a section not related to the hot spot,
   wherein during a second section among the plurality of sections, the controller controls to vary the voltage at both ends of the capacitor unit based on the detected voltage from the voltage detection unit, performs power calculation based on the detected current and the detected voltage while varying the voltage at both ends of the capacitor unit, continuously compares calculated power value with the existing stored power value, stores a greater of the power values, and calculate a finally stored power value as a second local maximum power value after termination of exploring the second section, and wherein the second section corresponds to a section related to the hot spot, and
   wherein the controller determines the maximum power value among the plurality of calculated local maximum power points including the first local maximum power value and the second local maximum power value.

2. The photovoltaic module of claim 1, wherein when the hot spot does not occur, the controller to control the voltage or current based on the supplied DC power from the solar cell module in a section, determine the maximum power value using the controlled voltage or controlled current, and to control the dc/dc converter unit to output the level-converted DC power based on the determined maximum power value.

3. The photovoltaic module of claim 2, wherein the dc/dc converter includes a switching element and the controller controls the voltage or the current based on the supplied DC power by controlling the switching element.

4. The photovoltaic module of claim 1, wherein the controller uses at least one of the detected current and the detected voltage to determine whether the hot spot has occurred.

5. The photovoltaic module of claim 1, wherein the controller calculates a point of inflection of a power versus voltage or current curved line in each of the sections, and calculates the calculated point of inflection as a local maximum power point.

6. The photovoltaic module of claim 2, wherein when a hot spot does not occur, the controller calculates a point of inflection of the power versus voltage or current curved line, and determines the calculated point of inflection as a maximum power value.

7. The photovoltaic module of claim 1, wherein a part of the bypass diodes bypass a solar cell in which a reverse voltage is generated, among the plurality of solar cells.

8. The photovoltaic module of claim 7, wherein when one or more of the bypass diodes are turned on, the controller determines that the hot spot has occurred.

9. The photovoltaic module of claim 1, wherein the junction box further comprises:
   an inverter unit to convert the level-converted DC power into AC power.

10. The photovoltaic module of claim 1,
   wherein the solar cell module includes a plurality of solar cell strings formed with some of the plurality of solar cells and a plurality of conductive lines electrically connecting the solar cell strings and a plurality of bypass diodes,
   wherein the plurality of conductive lines are extended to a rear surface of the solar cell module through corresponding openings penetrating the solar cell module,
   wherein the solar cell module further comprises a plurality of bus ribbons connecting adjacent solar cell strings, wherein one of the plurality of conductive lines connects the solar cell string and one of the plurality of bypass diodes, and wherein another of the plurality of conductive lines connects one of the plurality of bus ribbons and one of the plurality of bypass diodes.

11. A photovoltaic module comprising:

a solar cell module including a plurality of solar cells;

a plurality of bypass diodes;

a capacitor unit to store DC power supplied from the solar cell module;

a dc/dc converter unit to level-convert the stored DC power and output the level-converted DC power; and a current detection unit to detect current supplied to the capacitor unit;

a voltage detection unit to detect the voltage at both ends of the capacitor unit; and a controller to determine whether a hot spot has occurred, wherein when the controller determines that the hot spot has not occurred, the controller applying a first maximum power point tracking (MPPT) algorithm to control a voltage or current based on the supplied DC power from the solar cell module in a section where the section is a voltage range or a current range, determine a maximum power value using the controlled voltage or controlled current, and to control the dc/dc converter unit to output the level-converted DC power based on the determined maximum power value, wherein when the controller has determined that the hot spot has occurred, the controller applying a second maximum power point tracking (MPPT) algorithm to control the voltage or current based on the supplied DC power from the solar cell module among a plurality of sections, calculate a local maximum power point in each of the sections using the controlled voltage or controlled current, determine a maximum power value among a plurality of calculated local maximum power points, and to control the do/dc converter unit to output the level-converted DC power based on the determined maximum power value, wherein when the hot spot occurs in the solar cell module, during a first section among the plurality of sections, the controller controls to vary the voltage at both ends of the capacitor unit based on the detected voltage from the voltage detection unit, performs power calculation based on the detected current and the detected voltage while varying the voltage at both ends of the capacitor unit, continuously compares calculated power value with the existing stored power value, stores a greater of the power values, and calculate a finally stored power value as a first local maximum power value after termination of exploring the first section, and wherein the first section corresponds to a section not related to the hot spot, wherein during a second section among the plurality of sections, the controller controls to vary the voltage at both ends of the capacitor unit based on the detected voltage from the voltage detection unit, performs power calculation based on the detected current and the detected voltage while varying the voltage at both ends of the capacitor unit, continuously compares calculated power value with the existing stored power value, stores a greater of the power values, and calculate a finally stored power value as a second local maximum power value after termination of exploring the second section, and wherein the second section corresponds to a section related to the hot spot, and wherein the controller determines the maximum power value among the plurality of calculated local maximum power points including the first local maximum power value and the second local maximum power value.

12. The photovoltaic module of claim 11, wherein the dc/dc converter includes a switching element and the controller controls the voltage or the current based on the supplied DC power by controlling the switching element.

13. The photovoltaic module of claim 11, wherein the controller uses at least one of the detected current and the detected voltage to determine whether the hot spot has occurred.

14. The photovoltaic module of claim 11, wherein the controller uses at least one of the detected current and the detected voltage to determine the maximum power value.

15. The photovoltaic module of claim 11, wherein the solar cell module includes a plurality of solar cell strings formed with some of the plurality of solar cells and a plurality of conductive lines electrically connecting the solar cell strings and a plurality of bypass diodes, wherein the plurality of conductive lines are extended to a rear surface of the solar cell module through corresponding openings penetrating the solar cell module, wherein the solar cell module further comprises a plurality of bus ribbons connecting adjacent solar cell strings, wherein one of the plurality of conductive lines connects the solar cell string and one of the plurality of bypass diodes, and wherein another of the plurality of conductive lines connects one of the plurality of bus ribbons and one of the plurality of bypass diodes.

* * * * *